No. 627,270. Patented June 20, 1899.
J. B. RICE.
RAISIN SEEDER.
(Application filed Feb. 24, 1898.)
(No Model.) 2 Sheets—Sheet 1.
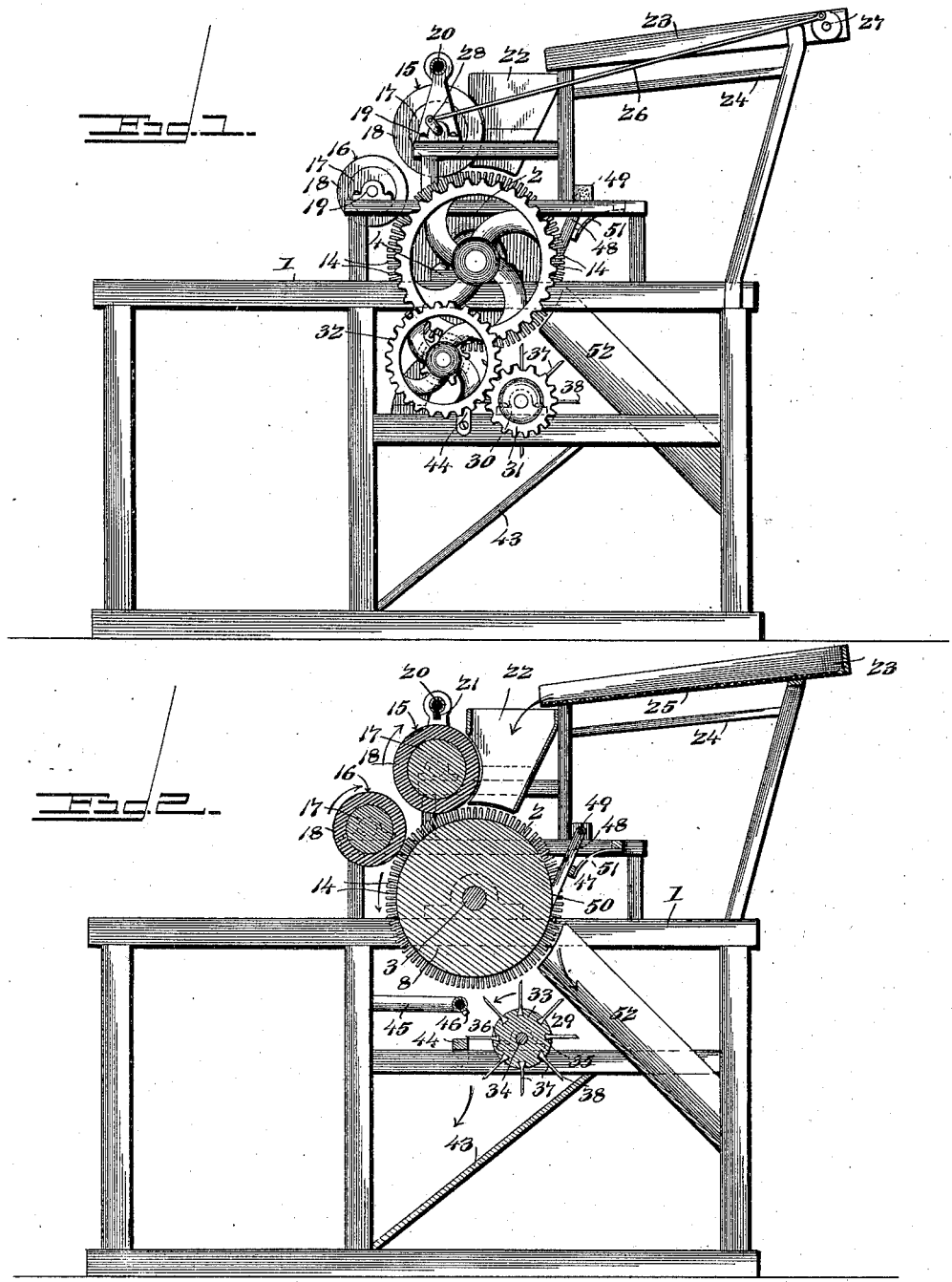
Witnesses
E. K. Stewart
D. T. Wolhaupter
John B. Rice, Inventor
By his Attorneys,
C. A. Snow & Co.

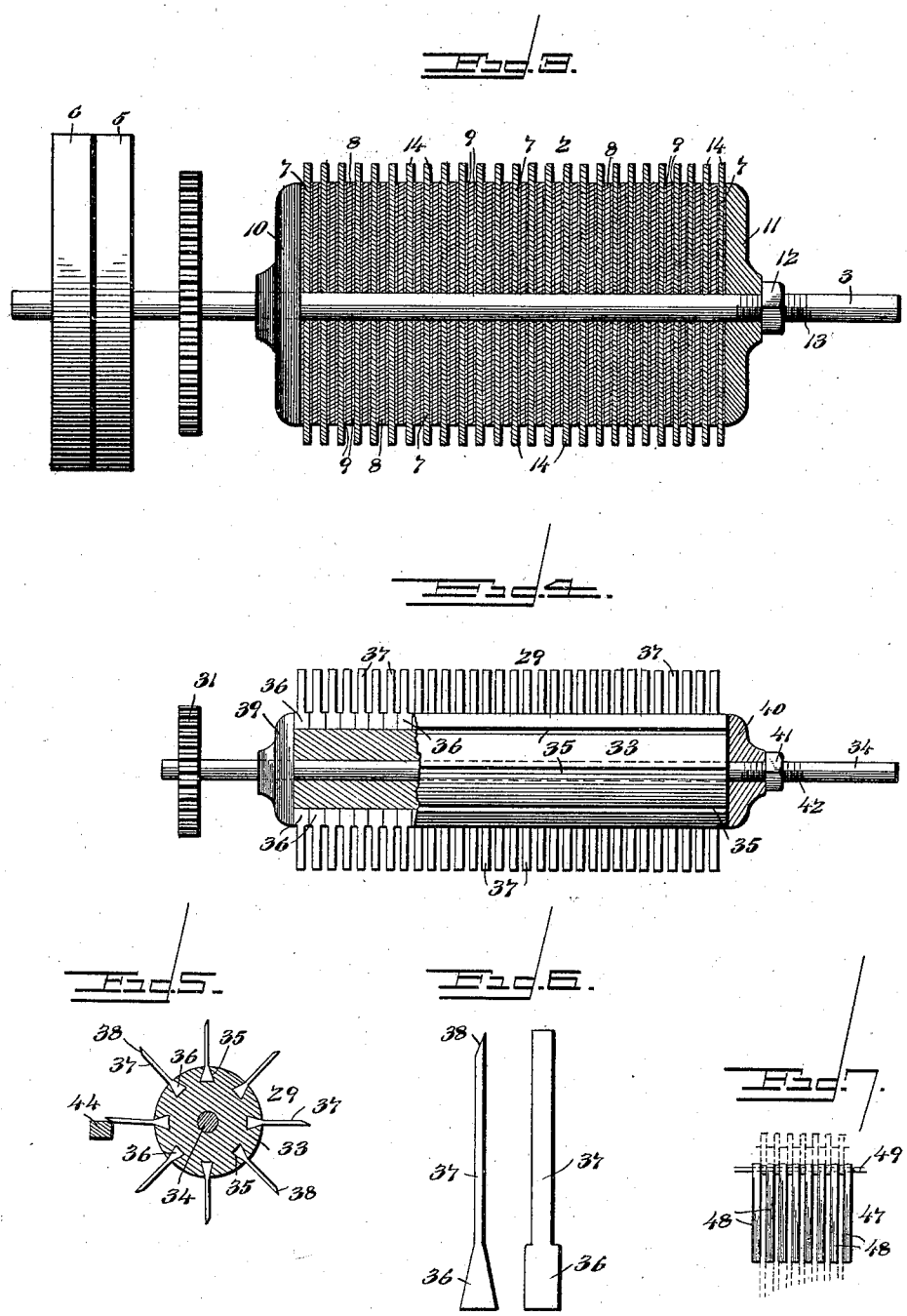

UNITED STATES PATENT OFFICE.

JOHN B. RICE, OF FRESNO, CALIFORNIA.

RAISIN-SEEDER.

SPECIFICATION forming part of Letters Patent No. 627,270, dated June 20, 1899.

Application filed February 24, 1898. Serial No. 671,508. (No model.)

*To all whom it may concern:*

Be it known that I, JOHN B. RICE, a citizen of the United States, residing at Fresno, in the county of Fresno and State of California, have invented a new and useful Raisin-Seeder, of which the following is a specification.

This invention relates to raisin-seeders; and it has for its object to effect certain improvements in that class of machines that are designed for removing the seed from raisins and similar dried fruit with a view of providing a machine having means for removing all of the seeds from the fruit in a rapid and cleanly manner without danger of cracking the seed or tearing the pulp of the raisin.

With these and other objects in view, which will readily appear as the nature of the invention is better understood, the same consists in the novel construction, combination, and arrangement of parts hereinafter more fully described, illustrated, and claimed.

In the drawings, Figure 1 is a side elevation of a raisin-seeder constructed in accordance with this invention. Fig. 2 is a vertical longitudinal sectional view thereof. Fig. 3 is an enlarged detail longitudinal sectional view of the rotary seeding-drum. Fig. 4 is a detail side elevation, partly in section, of the seed-doffing cylinder. Fig. 5 is a cross-sectional view of the doffing-cylinder. Fig. 6 is an edge view and elevation of one of the spring scraping fingers or blades of the doffing-cylinder. Fig. 7 is a detail elevation of the separating-comb for removing the seeded fruit from the seeding-drum.

Referring to the accompanying drawings, the numeral 1 designates the machine frame or stand, in which is arranged the horizontal rotating seeding-drum 2, the horizontal shaft 3 of which drum is journaled in suitable bearings 4 at opposite sides of the frame or stand and has mounted on one end thereof the fast and loose pulleys 5 and 6, which receive the driving-belt for transmitting motion to the machine. The horizontal rotating seeding-drum 2 essentially comprises a plurality of circular metallic impaling-disks 7 and spacing washers or plates 8, interposed or arranged between the disks, and to prevent the impaling-disks and the washers 8 from rusting under the action of the acidified juice from the fruit protective sheets 9, of waxed or similar paper, are interposed directly between the adjacent faces of said disks and the washers 8, as clearly illustrated in Fig. 3 of the drawings.

The circular metallic impaling-disks 7 alternate with the washers 8 and are of substantially the same thickness as the latter, so as to be arranged very closely together, in order that the peripheral spaces between the peripheral edges of the impaling-disks will be too small to receive therein raisins before the same are impaled on the impaling-points of the drum. The compactly and closely arranged series of impaling-disks and washers 8 are held tightly together to form the complete seeding-drum between the oppositely-located head-plates 10 and 11, arranged on the drum-shaft 3. The head-plate 10 for the seeding-drum is fixed fast on the shaft 3, while the opposite head 11 is loose thereon and is detachably clamped against one end of the separable drum by means of a clamping-nut 12, working on a threaded portion 13 of the drum-shaft.

The peripheral edges of the disks 7, which project beyond the peripheries of the washers 8, are formed with a continuous series of closely-arranged impaling-points 14, on which points the raisins are impaled by means of the horizontal presser-rolls 15 and 16, arranged above and parallel with the drum 2 and at one side of the plane of the vertical center of said drum. The presser-rolls 15 and 16 are duplicates in construction, each comprising a metal body 17 and a soft-rubber surface 18, vulcanized thereon and having their spindle extremities journaled in suitable bearings 19, arranged at opposite sides of the frame or stand 1. The presser-roll 15 is preferably of about one-half the size of the seeding-drum 2, but is of a larger size than the other presser-roll 16, which acts in the capacity of a supplemental or secondary roll, so as to supplement the pressing action of the main roll 15, which latter roll is arranged nearly in line with the vertical center of the seeding-drum, so as to act upon the raisins adjacent to the point where the same are fed onto the drum. The adjacent main and supplemental presser-rolls 15 and 16, respectively, have their rubber surfaces working in contact with the tips of the impaling-points 14, and thereby provide means, as the seeding-drum 2 is rotated in the direction of the arrow, for forcing the fruit upon the impaling-points 14 and into the peripheral spaces between the circular rows of such points. By reason of the arrangement of the rolls 15 and 16 and their contact with the impaling-points of the seeding-drum the adjacent peripheral surfaces of said rolls and said drum move in the same direction, and it will be obvious that the two presser-rolls by reason of their different sizes and location permit the machine to be operated very rapidly, while at the same time insuring the perforation of the fruit and the impalement thereof on the impaling-points. To provide for maintaining the surface of the main presser-roll 15 sufficiently moist to prevent the same from gumming or the fruit adhering thereto, a moistening-pipe 20 is arranged thereover and is provided with a plurality of jets 21, which serve to direct steam or water on the roll 15, and thereby accomplish the result desired.

The raisins or other fruit to be seeded are delivered to the seeding-drum 2, at one side of the upper or main presser-roll 15, through the feed-hopper 22, suitably supported within the machine frame or stand, within the top thereof, and receiving in its open side one side of said roll 15, which, therefore, assists in working the raisins out of the hopper, while at the same time impaling the raisins on the impaling-points. The fruit is discharged into the hopper 22 from an inclined shaking-riddle 23, movably supported on an extension 24 of the machine-frame and arranged with its lower end overhanging the hopper 22. The said shaking-riddle 23 is provided with a screen-bottom 25, which permits the sand and other impurities being sifted or screened from the bulk of raisins before the same are worked over the lower end of the riddle into the hopper, and a longitudinal vibration may be conveniently imparted to the riddle 23 by means of a shaker-bar 26, suitably connected at one end, as at 27, to one end of the riddle and at its other end to a crank-arm 28, carried by one of the spindle extremities of the upper or main presser-roll 15. The riddle 23 not only serves to clean the raisins, but prevents the same from bunching.

The impalement of the fruit on the impaling-fingers 14 by the presser-rolls 15 and 16 serves to force the seed from the pulp of the raisins, so that the impaling-points and the spaces between such points will carry the seed, while the seeded pulp will lie in the peripheral spaces between the rows of points 14, and to provide for knocking or brushing the seeds from the impaling-points a horizontal seed-doffing cylinder 29 is employed. The seed-doffing cylinder 29 is arranged horizontally below the seeding-drum 2 and has its shaft extremities journaled in suitable bearings 30 at opposite sides of the machine-frame, one of said shaft extremities carrying a gear-wheel 31, which is in mesh with suitable gearing 32, driven by the drum-shaft 3, providing means for imparting to the doffing-cylinder 29 a faster rotation than the drum 2 and in an opposite direction to the latter.

The seed-doffing cylinder 29 essentially comprises a cylindrical body 33, mounted on the shaft 34 and provided with a peripheral series of longitudinal parallel dovetailed grooves 35, which removably receive the dovetailed heels 36 of a series of separate closely-arranged spring-steel scraping-fingers 37, which are provided with beveled ends 38, working in close relation to the impaling-points 14 of the seeding-drum. The rows of yielding scraping-fingers 37 are detachably clamped together in their respective seats or grooves 35 by means of the oppositely-located clamping-heads 39 and 40, which are respectively fast and loose on the shaft 34. The loose clamping-head 40 is held against one end of the cylinder-body 33 by means of a clamping-nut 41 working on a threaded portion 32 of the shaft 34.

The spring scraping-fingers 37 are arranged side by side in longitudinal rows within each longitudinal groove 35 of the cylinder-body 33, with their heel portions 36 in direct contact, so that when the head 40 is tightened up the fingers will be held firmly in place, although being capable of being readily removed and replaced when broken in substantially the same manner as the disks 7 of the seeding-drum. The said fingers 37 are also very closely arranged, so as to strike all of the impaling-points 14 and have a brushing action thereon to provide for removing the seed from such points and throwing the same onto the inclined seed-board 43, fitted within the machine-frame below said doffing-cylinder. The seed are cleaned from the ends of the fingers 37 by means of a horizontal scraper-bar 44, secured rigidly within the machine-frame at one side of the cylinder 29 and directly in the path of the ends of the yielding fingers 37, which strike thereon as the cylinder 29 rotates, and in order to facilitate the cleaning of said fingers 37 by preventing accumulations of gum thereon there is employed a moistening-pipe 45 for steam or water and having a plurality of jets 46, disposed so as to jet the steam or water on said fingers 37.

The seeded fruit or pulp is removed from the drum 2 by means of a separating-comb 47, essentially comprising a series of scraper-arms 48, pivotally hung at their upper ends from a transverse supporting-rod 49 and having beveled lower ends 50, bearing on the peripheries of the washers 8 in the spaces between the rows of impaling-points 14. The arms 48 are held yieldingly in a working position by means of a suitable spring 51, exerting a pressure against one side of the entire row or series of such arms. As the seeding-drum 2 rotates the beveled ends of the comb-arms 48 force the fruit out of the peripheral spaces of the drum and cause the same to fall through the fruit-delivery chute 52 into a suitable receptacle for receiving the same, said chute 52 being arranged in an inclined position, with its upper end disposed immediately below the comb 47 adjacent to the seeding-drum.

From the foregoing it is thought the construction, operation, and many advantages of the herein-described raisin-seeder will be readily apparent to those skilled in the art without further description, and it will be understood that various changes in the form, proportion, and the minor details of construction may be resorted to without departing from the principle or sacrificing any of the advantages of this invention.

Having thus described the invention, what is claimed, and desired to be secured by Letters Patent, is—

1. In a raisin-seeder, the combination with the seeding-drum, and means for removing the seeded fruit therefrom; of a rotary seed-doffer having a plurality of yielding spring-fingers working in close relation to the seeding-drum, and a stationary or fixed scraper-bar arranged directly in the path of the ends of said yielding fingers, substantially as set forth.

2. In a raisin-seeder, the combination with the seeding-drum having impaling-points, of a seed-doffing cylinder arranged at one side of the drum and comprising a cylindrical body having a peripheral series of longitudinal parallel dovetailed grooves, a series of closely-arranged flat spring-fingers having integral dovetailed heel portions fitting in said grooves, said fingers being arranged in longitudinal rows within each groove with their flat faces lying in the same longitudinal plane, and provided with outer beveled ends working in close relation to the impaling-points of the seeding-drum, and common clamping means for holding all of the fingers within the grooves of the cylindrical body, substantially as set forth.

3. In a raisin-seeder, a rotating seeding-drum having peripheral rows of impaling-points, means for impaling the fruit on said points, a seed-doffing cylinder arranged at one side of the drum and having rows of yielding spring scraping-fingers working in close relation to the impaling-points, a stationary or fixed scraper-bar arranged directly in the path of the ends of said yielding fingers, and means for removing the seeded fruit from the drum, substantially as set forth.

4. In a raisin-seeder, a rotating seeding-drum having peripheral impaling-points, means for impaling the fruit on said points, a seed-doffing cylinder arranged at one side of the drum and comprising a cylindrical body having a peripheral series of longitudinal grooves, a series of closely-arranged yielding scraping-fingers having heel portions fitting in said grooves, said scraping-fingers being arranged in longitudinal rows within each groove, and clamping means for holding said fingers within the grooves of the cylinder-body, and means for removing the seeded fruit from the drum, substantially as set forth.

In testimony that I claim the foregoing as my own I have hereto affixed my signature in the presence of two witnesses.

JOHN B. RICE.

Witnesses:
 W. O. MILES,
 E. K. FERNALD.